US012780202B2

(12) United States Patent
Ito

(10) Patent No.: US 12,780,202 B2

(45) Date of Patent: Nov. 3, 2026

(54) DRIVING SUPPORT DEVICE FOR CONTROLLING START OF OWN VEHICLE BASED ON DRIVER ATTENTION STATE

(71) Applicant: TOYOTA JIDOSHA KABUSHIKI KAISHA, Toyota (JP)

(72) Inventor: Yuma Ito, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 18/420,345

(22) Filed: Jan. 23, 2024

(65) Prior Publication Data

US 2024/0270249 A1 Aug. 15, 2024

(30) Foreign Application Priority Data

Feb. 10, 2023 (JP) ................................ 2023-019079

(51) Int. Cl.
*B60W 50/14* (2020.01)
*B60W 30/18* (2012.01)

(52) U.S. Cl.
CPC ...... *B60W 30/18027* (2013.01); *B60W 50/14* (2013.01); *B60W 2540/229* (2020.02); *B60W 2554/4041* (2020.02); *B60W 2554/4046* (2020.02)

(58) Field of Classification Search
CPC ........... B60W 50/14; B60W 30/18027; B60W 30/18009; B60K 31/0008
See application file for complete search history.

(56) References Cited

U.S. PATENT DOCUMENTS

| | | | | |
|---|---|---|---|---|
| 8,355,851 | B2 | 1/2013 | Inoue et al. | |
| 8,370,040 | B2 | 2/2013 | Inoue et al. | |
| 8,417,430 | B2 | 4/2013 | Saeki | |
| 8,548,709 | B2 | 10/2013 | Morita | |
| 8,768,597 | B2 | 7/2014 | Kagawa | |
| 9,174,643 | B2 | 11/2015 | Aso | |
| 9,809,167 | B1 * | 11/2017 | Badger, II | B60W 50/14 |
| 10,017,178 | B2 | 7/2018 | Morimoto et al. | |
| 10,118,617 | B2 | 11/2018 | Urano et al. | |
| 10,137,893 | B2 * | 11/2018 | Hanna | G06V 20/597 |
| 10,486,698 | B2 | 11/2019 | Masui et al. | |
| 12,434,707 | B2 * | 10/2025 | Ito | B60W 40/08 |
| 2017/0259821 | A1 * | 9/2017 | Nakadori | B60W 50/14 |
| 2019/0256106 | A1 * | 8/2019 | Lee | B60W 50/14 |

(Continued)

FOREIGN PATENT DOCUMENTS

| | | | |
|---|---|---|---|
| JP | 4962137 | B2 | 6/2012 |
| JP | 2018-86874 | A | 6/2018 |
| JP | 2020-073045 | A | 5/2020 |

*Primary Examiner* — Dino Kujundzic
(74) *Attorney, Agent, or Firm* — Sughrue Mion, PLLC

(57) ABSTRACT

The driving support device 1 controls the own vehicle to start in a predetermined first manner in the first situation, where a first condition for determining that the preceding vehicle has started is met at the first moment and the driver of the own vehicle is determined to be paying attention to the front of the own vehicle. In the second situation, where the second condition is not met at the first moment and later at the second moment, the first condition is met, the driving support device 1 controls the own vehicle to start in a second manner where the acceleration of the own vehicle is more suppressed compared to the first manner.

6 Claims, 5 Drawing Sheets

(56) References Cited

U.S. PATENT DOCUMENTS

| | | | | |
|---|---|---|---|---|
| 2019/0283764 | A1* | 9/2019 | Morimoto | B60W 30/17 |
| 2019/0295419 | A1 | 9/2019 | Tosa et al. | |
| 2021/0081690 | A1* | 3/2021 | Inagaki | G06V 40/161 |

* cited by examiner

DRIVING SUPPORT DEVICE FOR CONTROLLING START OF OWN VEHICLE BASED ON DRIVER ATTENTION STATE

BACKGROUND OF THE INVENTION

The present invention relates to a driving support device, a driving support method, and a driving support program that control the drive apparatus, etc., of the own vehicle so that it follows a preceding vehicle (another vehicle traveling directly in front of the own vehicle).

DESCRIPTION OF THE RELATED ART

A driving support device has been proposed which, in situations where both the preceding vehicle and the own vehicle are stopped, starts the own vehicle to follow the preceding vehicle when the preceding vehicle starts (refer to Japanese Patent Laid-Open No. 2018-86874, for example). The driving support device in the Patent Document (hereinafter referred to as "conventional device") controls the own vehicle to start following the preceding vehicle when it detects that the preceding vehicle has started. In other words, according to the conventional device, when the preceding vehicle starts, the driver can start the own vehicle automatically without operating a switch, an accelerator pedal, etc.

SUMMARY

However, when the preceding vehicle starts, if the driver of the own vehicle is paying attention to the front (first situation), the driver's expectation that the own vehicle will start automatically is high. On the contrary, if the driver of the own vehicle is not paying attention to the front when the preceding vehicle starts and then pays attention to the front later (second situation), the driver's expectation that the own vehicle will start automatically is not so high. The conventional device controls the drive apparatus, etc., of the own vehicle so that the starting manner of the own vehicle (e.g., the manner of change in acceleration, the manner of change in speed, etc.) matches a predetermined manner. That is, the starting manner of the own vehicle under the first situation and the second situation are the same. Therefore, for example, if the conventional device is configured to start the own vehicle with a relatively large acceleration, there is a possibility that the driver feels the acceleration of the own vehicle is too abrupt in the second situation (where the driver's expectation of the own vehicle starting automatically is low). Conversely, if the conventional device is configured to start the own vehicle with a relatively small acceleration, there is a possibility that the driver feels the acceleration of the own vehicle is too sluggish in the first situation (where the driver's expectation of the own vehicle starting automatically is high).

One object of the present invention is to provide a driving support device that controls the own vehicle to start in a manner that meets the driver's expectations when the preceding vehicle starts.

To achieve the above object, a driving support device (1) according to the present invention includes a front sensor (21, 22, 23) that acquires information about the behavior of the preceding vehicle, a driver sensor (24) that acquires information about the direction the driver of the own vehicle is paying attention to, and a processor (10) that controls the own vehicle to start in a predetermined manner when a certain first condition ($v0>v0th$, $D>Dth$) is met for determining that the preceding vehicle has started while the preceding vehicle is stopped and the own vehicle is stopped immediately behind the preceding vehicle. The processor controls the own vehicle to start in a predetermined first manner (Jc) in a first situation where the second condition ($\theta \leq \theta th$) for determining that the driver of the own vehicle was paying attention to the front of the own vehicle at a first point in time when the first condition is met is met, and controls the own vehicle to start in a second manner (Jd) where the acceleration of the own vehicle is suppressed compared to the first manner in a second situation where the second condition is not met at the first point in time and is met at a subsequent second point in time.

In the first situation where the processor determines that the preceding vehicle has started and the driver is paying attention to the front, the driver's expectation that the own vehicle will automatically start to follow the preceding vehicle is high. On the other hand, in the second situation where the driver is not paying attention to the front at the first point in time and then pays attention to the front afterwards, the driver's expectation that the own vehicle will automatically start to follow the preceding vehicle is not so high. The processor starts the own vehicle in the first manner in the first situation. In the second situation, it starts the own vehicle in the second manner, where the acceleration of the own vehicle is suppressed compared to the first manner. Thus, according to the present invention, the own vehicle can be started in a manner that meets the driver's expectations when the preceding vehicle starts.

In one embodiment of the driving support device according to the present invention, a notification device (50) is provided to present certain information to the driver of the own vehicle, and the processor, at the first point in time, presents information through the notification device to prompt the driver to pay attention to the front, if the second condition is not met.

If the driver is not paying attention to the front (e.g., looking away), there is a possibility that the driver does not notice that the preceding vehicle has started. According to this embodiment, information is presented to the driver from the notification device. This allows the driver to recognize that the preceding vehicle has started and to pay attention to the front.

In another embodiment of the driving support device according to the present invention, the processor controls the own vehicle to match the jerk to a first predetermined value (Jc) when starting the own vehicle in the first situation, and controls the own vehicle to match the jerk to a second predetermined value (Jd) that is smaller than the first predetermined value when starting the own vehicle in the second situation.

Accordingly, in the second situation, it is possible to accelerate the own vehicle relatively gently.

BRIEF DESCRIPTION OF THE DRAWINGS

FIG. 2 is a plan view showing the direction (angle $\theta$) the driver is paying attention to.

DESCRIPTION OF THE EMBODIMENTS (Overview)

In one embodiment of the present invention, the driving support device 1 is applicable, for example, to a vehicle V (hereinafter referred to as "own vehicle") equipped with an automatic driving function. The driving support device 1 has a function (automatic start function) to control the drive apparatus, etc., of the own vehicle to start following the preceding vehicle PV (a vehicle located directly in front of the own vehicle) when the preceding vehicle PV stops and then the own vehicle stops immediately afterwards, and when the preceding vehicle PV starts or certain conditions are met thereafter.

(Detailed Configuration)

Figure 1:
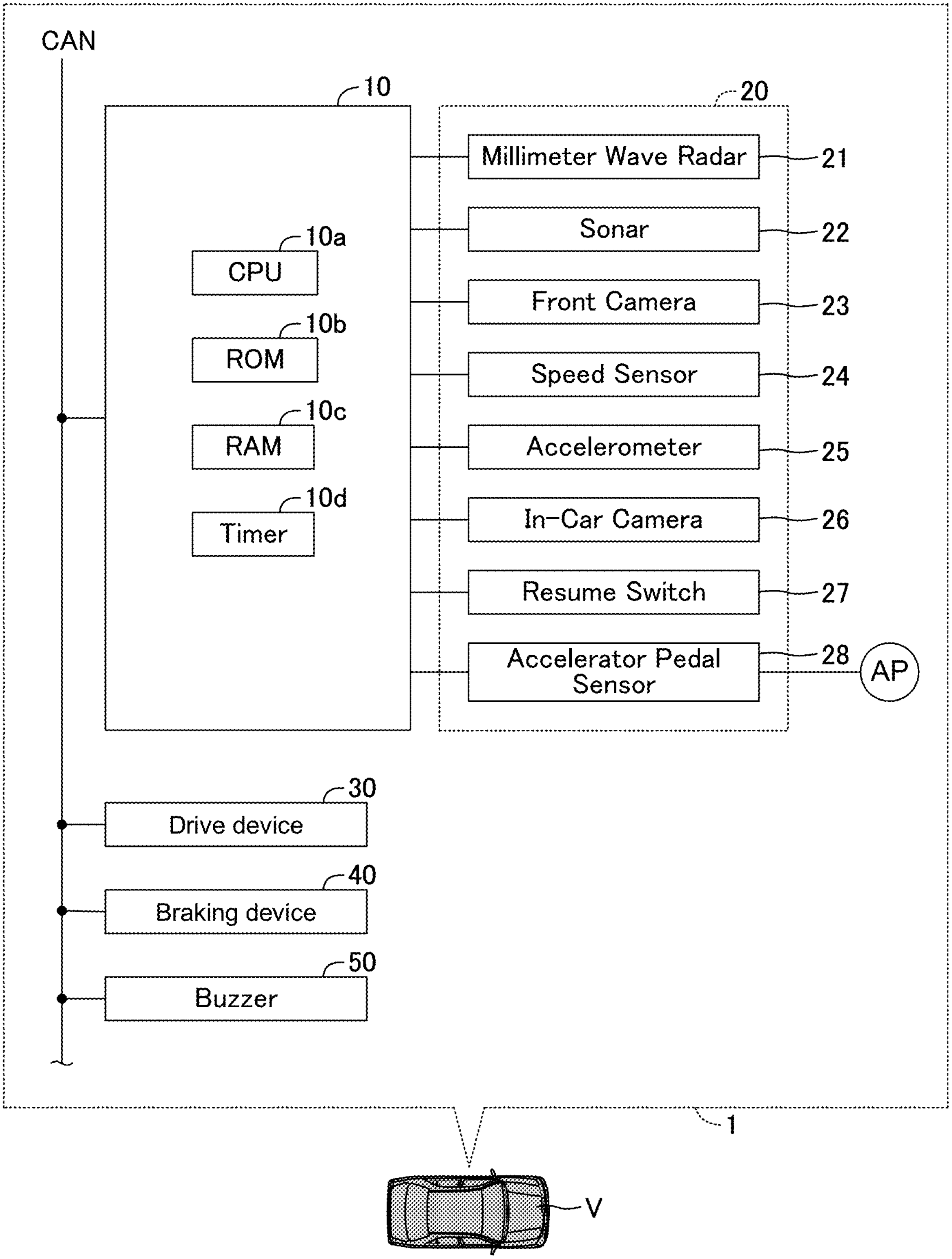
FIG. 1 is a block diagram of a driving support device according to one embodiment of the present invention.

As shown in FIG. 1, the driving support device 1 includes a driving support ECU 10, onboard sensors 20, a drive device 30, a braking device 40, and a buzzer 50.

The driving support ECU 10 includes a microcomputer with a CPU 10*a*, ROM 10*b*, RAM 10*c*, timer 10*d*, etc. The driving support ECU 10 is connected to other ECUs of the own vehicle via a CAN (Controller Area Network).

The onboard sensors 20 include a forward sensor that acquires information about the preceding vehicle PV. Specifically, the onboard sensors 20 include a millimeter-wave radar 21, sonar 22, and a forward camera 23 as forward sensors.

The millimeter-wave radar 21 is equipped with a transceiver and a signal processing unit (not shown). The transceiver emits millimeter waves (hereinafter referred to as "millimeter waves") in front of the own vehicle and receives millimeter waves (reflected waves) reflected by a three-dimensional object (preceding vehicle PV) located within the emission range. The signal processing unit calculates the distance between the own vehicle and the three-dimensional object, the speed of the object, etc., based on the time from the emission of the millimeter waves to the reception of the reflected waves, the phase difference between the transmitted millimeter waves and the received reflected waves, and the attenuation level of the reflected waves, and transmits the calculation results to the driving support ECU 10.

The sonar 22 intermittently emits ultrasonic waves into the surrounding area of the own vehicle and receives ultrasonic waves (reflected waves) reflected by a three-dimensional object. The sonar 22 calculates the distance between the own vehicle and the three-dimensional object, the relative position (direction) of the object to the own vehicle, etc., based on the time from the transmission of the ultrasonic waves to the reception of the reflected waves and transmits the calculation results to the driving support ECU 10.

The forward camera 23 includes an imaging device and an image analysis device. The imaging device is a digital camera with an imaging element such as a CCD (charge-coupled device) or CIS (CMOS image sensor). The imaging device is directed forward at the upper part of the front windshield glass. The imaging device captures the foreground of the own vehicle at a predetermined frame rate and acquires image data. The imaging device transmits the image data to the image analysis device. The image analysis device analyzes the acquired image data and obtains information about objects located in front of the own vehicle from the images. For example, the image analysis device identifies (recognizes) the type of objects in front of the own vehicle (e.g., other vehicles, guardrails, etc.) and transmits the identification results to the driving support ECU 10.

Additionally, the onboard sensors 20 include a driver sensor (driver monitor) that acquires information about the state of the driver (the direction the driver is paying attention to). Specifically, the onboard sensors 20 include an in-vehicle camera 24 as the driver sensor.

Figure 2:
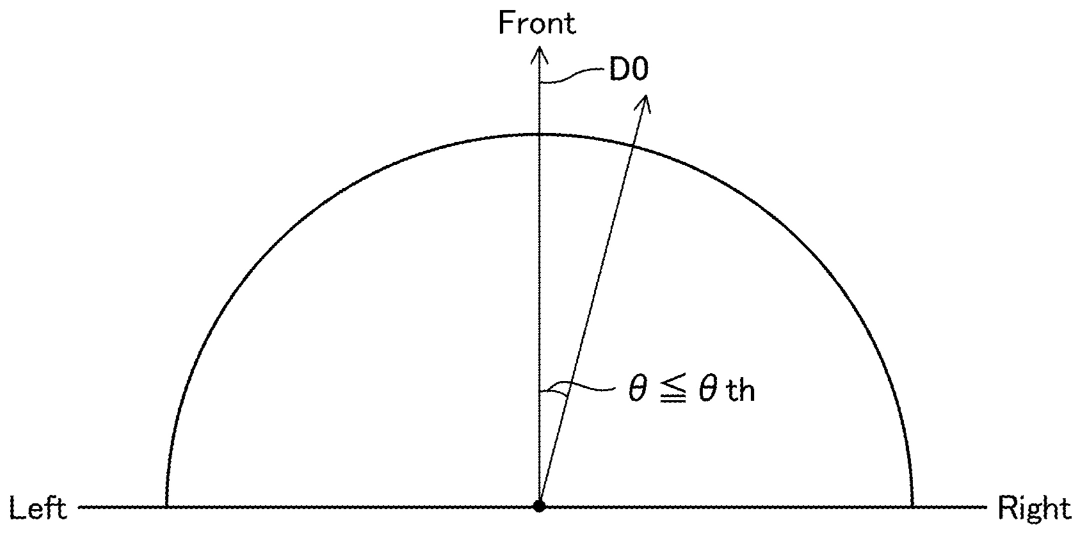

The in-vehicle camera 24, like the forward camera 23, includes an imaging device and an image analysis device. The imaging device, for example, is installed inside the dashboard (instrument panel) of the own vehicle and directed towards the driver's seat. The imaging device captures the driver at a predetermined frame rate and outputs the obtained image data to the image analysis device. The image analysis device analyzes the acquired image data and calculates the direction the driver is paying attention to (e.g., the angle relative to the front-rear direction DO of the own vehicle in a plan view, as shown in FIG. 2) based on the orientation of the driver's face, the direction of the eyes, etc. The image analysis device transmits the calculation results (angle $\theta$) to the driving support ECU 10.

Additionally, the onboard sensors 20 include vehicle sensors that acquire information about the running state (speed and acceleration) of the own vehicle. Specifically, the onboard sensors 20 include a speed sensor 25 and an acceleration sensor 26 as vehicle sensors.

The speed sensor 25 detects the rotational speed of each wheel (wheel speed) and calculates the speed of the own vehicle (vs) (actual vehicle speed) based on the wheel speed of each wheel. The speed sensor 25 transmits data representing the speed (vs) to the driving support ECU 10.

The acceleration sensor 26 detects the acceleration (a) in the front-rear direction of the own vehicle. The acceleration sensor 26 transmits data representing the acceleration (a) to the driving support ECU 10. Additionally, the acceleration sensor 26 calculates the jerk (J) (rate of change of acceleration) based on the time series data of the acceleration (a) and transmits data representing the jerk (J) to the driving support ECU 10.

Furthermore, the onboard sensors 20 include a resume switch 27 and an accelerator pedal sensor 28 as operation sensors. The resume switch 27 includes a push-button type switch element and is, for example, incorporated into the spoke of the steering wheel. The driving support ECU 10 monitors the on/off state of the resume switch 27. The accelerator pedal sensor 28 detects the depression depth (AD) of the accelerator pedal (AP) of the own vehicle. The accelerator pedal sensor 28 transmits data representing the detected depression depth (AD) to the driving support ECU 10.

The drive device 30 imparts driving force to the drive wheels. The drive device 30 includes an engine ECU, internal combustion engine, transmission, and a drive force transmission mechanism that transmits the driving force to the wheels. The engine ECU acquires information representing the target driving force (target value) from other ECUs (driving support ECU 10) and controls the throttle valve of the internal combustion engine based on this information to control the driving force imparted to the drive wheels. The driving force generated by the internal combustion engine is transmitted to the drive wheels through the transmission and drive force transmission mechanism. In addition, the engine ECU acquires information (control signal) about the shift position of the transmission equipped in the own vehicle and controls the shift position based on this information.

Note that if the vehicle to which the driving support device 1 is applied is a hybrid vehicle (HEV), the engine ECU can control the driving force of the vehicle generated by either or both of the 'internal combustion engine and electric motor' as the vehicle's drive source. Also, if the vehicle to which the driving support device 1 is applied is an electric vehicle (BEV), an electric motor ECU can be used instead of the engine ECU to control the driving force of the vehicle generated by the 'electric motor' as the vehicle's drive source.

The braking device 40 applies braking force to the wheels (brake discs). The braking device 40 includes a brake ECU, brake calipers, etc. The brake calipers include an actuator that presses the brake pads against the brake discs. The brake ECU acquires information representing the target braking force (control signal) from other ECUs and drives the actuator of the brake calipers based on this information. In this way, the braking force applied to the wheels (brake discs) is controlled.

The buzzer 50 reproduces (sounds) a predetermined sound (chime) in accordance with a command transmitted from the driving support ECU 10.

(Operation)

When the ACC switch (not shown) installed in the own vehicle is in the on state, the driving support ECU 10 determines the presence or absence of the preceding vehicle PV, as described below, and based on the determination result, controls the drive device 30 and the braking device 40 (hereinafter referred to as "drive device, etc."). This control is sometimes referred to as Adaptive Cruise Control (ACC). ACC includes constant speed driving control and vehicle-to-vehicle (inter-vehicle) distance keep control.

(Constant Speed Driving Control)

The driving support ECU 10 determines whether the preceding vehicle PV is present or not based on information from the forward sensors (millimeter-wave radar 21, sonar 22, and forward camera 23). If there is no preceding vehicle PV, the driving support ECU 10 performs constant speed control. Specifically, it controls the drive device and other systems to maintain the own vehicle's speed (vs) at a preset speed (vd), such as the speed where fuel consumption is lowest.

(Vehicle-to-Vehicle Distance Control)

If the driving support ECU 10 detects the presence of a preceding vehicle PV, it performs vehicle-to-vehicle distance control. The ECU 10 uses data from the forward sensors to determine the distance (D) between the preceding vehicle PV and the own vehicle, as well as the speed (v0) of the preceding vehicle PV. It also obtains the speed (vs) of the own vehicle from the speed sensor 25 and calculates the desired distance (Dd) to maintain between vehicles.

When the speed (v0) of the preceding vehicle PV is greater than that (vs) of the own vehicle (relative speed vr=v0−vs), the distance (D) between vehicles tends to increase. If this distance (D) exceeds the desired distance (Dd), the driving support ECU 10 sets the target acceleration (a) of the own vehicle to a value greater than '0'. This adjustment (acceleration control) is made so that the actual acceleration (a) aligns with this target, thereby reducing the distance (D) to the desired level (Dd). Once the distance (D) aligns with the desired distance (Dd), the ECU sets the target acceleration (a) to '0', effectively matching the speed of the own vehicle to that of the preceding vehicle PV.

Conversely, if the relative speed (vr) is less than '0', the distance between vehicles (D) tends to decrease. If this distance (D) is less than the desired distance (Dd), the ECU sets the target acceleration (a) of the own vehicle to a value less than '0'. This adjustment (deceleration control) ensures that the actual acceleration (a) aligns with the target, increasing the distance (D) to the desired level (Dd). Once the distance (D) matches the desired distance (Dd), the ECU sets the target acceleration (a) to '0'.

The desired distance (Dd) correlates with the speeds (vs and v0) of both vehicles. For instance, the desired distance (Dd) at lower speeds is smaller than at higher speeds. A database or parameters defining the calculation formula for the desired distance are stored in ROM 10*b*. The driving support ECU 10 uses this information to determine the appropriate desired distance (Dd).

If the preceding vehicle PV stops (v0=0 km/h) during vehicle-to-vehicle distance control, the driving support ECU 10 stops the own vehicle (vs=0 km/h) behind it. Then, when the preceding vehicle PV starts again, the ECU activates a following start control function to control the drive device and other systems, prompting the own vehicle to start and follow the preceding vehicle PV.

(Following Start Control)

The driving support ECU 10 measures the time Δt elapsed since the moment t0 when the own vehicle stopped behind the stopped preceding vehicle PV. The ECU 10 also continuously determines whether the preceding vehicle PV has started or not based on information from the forward sensors. For example, the ECU 10 judges that the preceding vehicle PV has started (preceding vehicle start flag FPS='1') when the speed v0 of the preceding vehicle PV obtained from the millimeter-wave radar 21 exceeds a predetermined threshold v0th (when the first condition is met). Alternatively, the ECU 10 may also judge that the preceding vehicle PV has started when the distance D between the preceding vehicle PV and the own vehicle exceeds a threshold Dth.

If the time Δt from the moment t0 when the own vehicle stopped until the moment t1 when it is determined that the preceding vehicle PV has started is less than or equal to a threshold Δtth (for example, 3 seconds), the driving support ECU 10 controls the drive device, etc., to start the own vehicle following the preceding vehicle PV. After the own vehicle starts, the ECU 10 controls the drive device, etc., so that the acceleration a of the own vehicle gradually increases to reach a predetermined value α1. In this case, the ECU 10 controls the drive device, etc., so that the jerk J of the own vehicle matches a predetermined value Ja.

If the time Δt from the moment t0 to the moment t1 exceeds the threshold Δtth, the driving support ECU 10 controls the own vehicle as follows.

The driving support ECU 10 starts the own vehicle when it detects that the driver has performed a predetermined operation, indicating an intention to start the vehicle. Specifically, for example, if the resume switch 27 is pressed, the ECU 10 starts the own vehicle. Also, the ECU 10 may start the own vehicle if it detects from the accelerator pedal sensor 28 that the depression depth AD of the accelerator pedal AP has exceeded a relatively shallow threshold and then returned to '0' (release state).

When the driving support ECU 10 starts the own vehicle triggered by the operation of the resume switch 27 or the accelerator pedal AP by the driver, it controls the drive device, etc., so that the acceleration a of the own vehicle gradually increases to reach a predetermined value α1. The ECU 10 also controls the jerk J so that it matches a predetermined value Jb, which may be larger than, the same as, or smaller than the predetermined value Ja.

Figure 3:
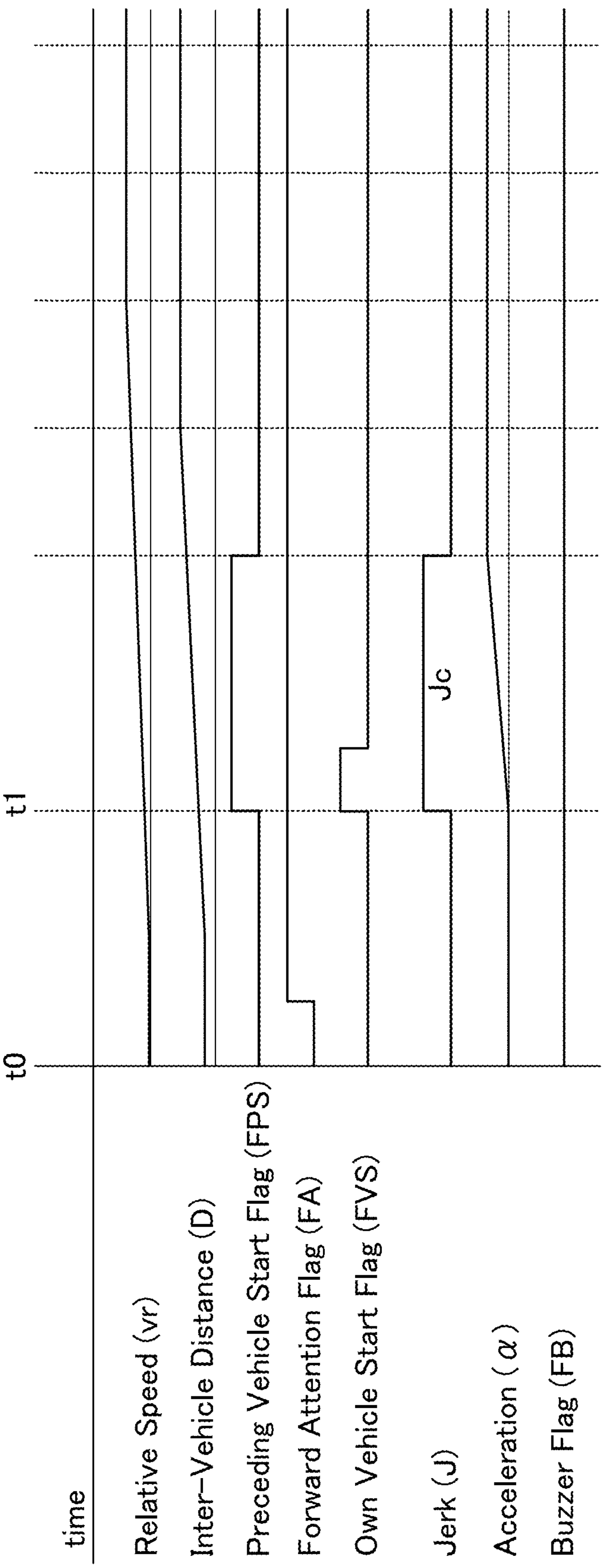
FIG. 3 is a timing chart showing a schematic of following start control in the first situation.

If the time Δt from the moment t0 to the moment t1 exceeds the threshold Δtth, the driving support ECU 10 starts the own vehicle without requiring operation of the resume switch 27 or accelerator pedal AP by the driver, provided that the preceding vehicle PV has started at the moment t1 (when the preceding vehicle start flag FPS transitions from '0' to '1') or later and the driver is paying attention to the front. FIG. 3 shows a timing chart summarizing the following start control when the driver is paying attention to the front at the moment t1, and FIG. 4 shows a timing chart for when the driver starts paying attention to the front at a moment t2 after t1.

Specifically, in situations where the time Δt exceeds the threshold Δtth, as shown in FIG. 3, the driving support ECU 10 continuously obtains the angle θ from the in-vehicle camera 24 and determines whether the driver is paying attention to the front based on the angle θ. If the angle θ is below a threshold θth (when the second condition is met), the ECU 10 judges that the driver is paying attention to the front. If the ECU 10 determines that the driver is paying attention to the front at the moment t1 (i.e., the front attention flag FA='1' at the moment t1), it controls the drive device, etc., to start the own vehicle following the preceding vehicle PV, setting the own vehicle start flag FVS to '1' at the moment t1. This results in the start of the own vehicle at the moment t1.

Figure 4:
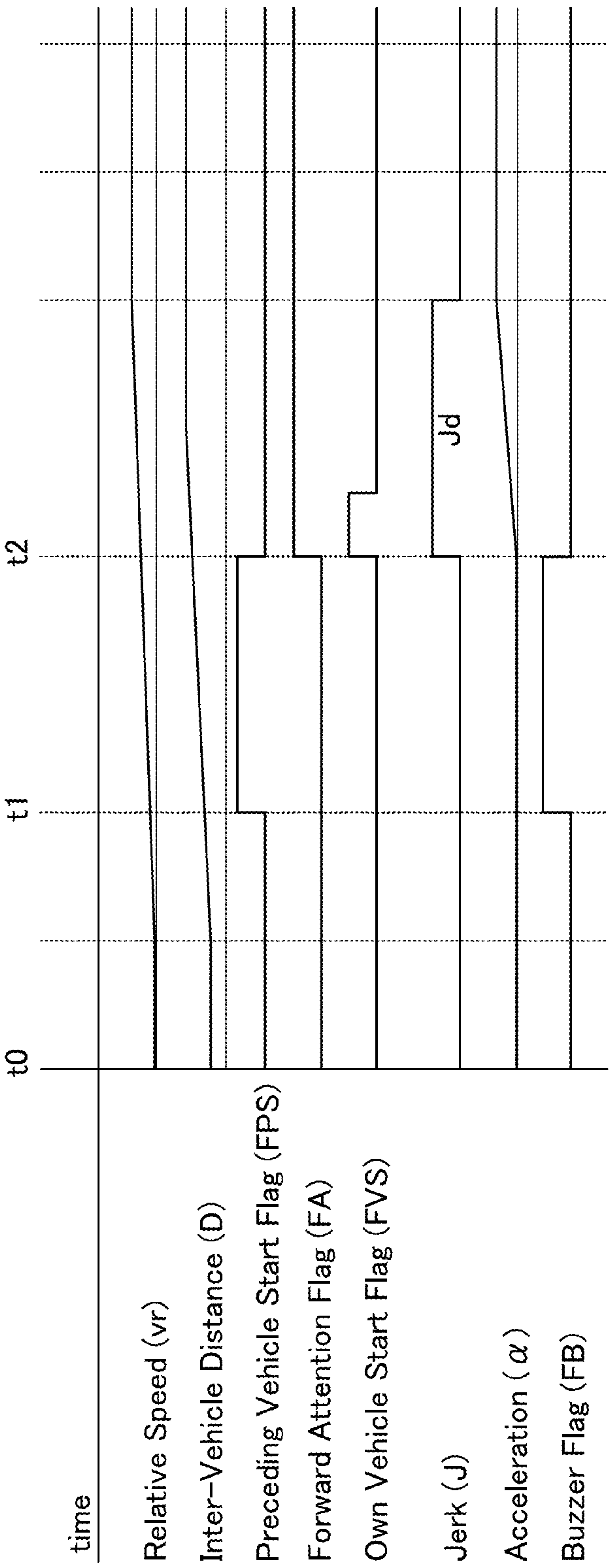
FIG. 4 is a timing chart showing a schematic of following start control in the second situation.

However, as shown in FIG. 4, if at the moment t1 the driving support ECU 10 determines that the driver is not paying attention to the front (the driver is looking away (meaning the front attention flag FA='0' at moment t1)), it activates the buzzer 50 (buzzer flag FB='1') to prompt the driver to pay attention to the front, while continuing to obtain the angle θ from the in-vehicle camera 24. If the ECU 10 determines that the driver is paying attention to the front at a later moment t2, it controls the drive device and other systems to start the own vehicle following the preceding vehicle PV. In other words, it sets the own vehicle start flag FVS to '1' at moment t2 after t1, resulting in the start of the own vehicle at moment t2.

As mentioned above, if the driving support ECU 10 determines at the moment t1 when the preceding vehicle PV has started that the driver is paying attention to the front (referred to as the 'first situation'), it starts the own vehicle without activating the buzzer 50. In this case, the ECU 10 controls the drive device and other systems so that the jerk J matches a predetermined value Jc. On the other hand, if the driver is not paying attention to the front at moment t1, the ECU 10 activates the buzzer 50. If the driver then pays attention to the front afterward (referred to as the 'second situation'), the ECU 10 starts the own vehicle. In this case (when the vehicle is started after activating the buzzer 50), the ECU 10 controls the drive device and other systems so that the jerk J matches a predetermined value Jd, which may be smaller, the same as, or larger than the predetermined value Jc or Ja.

Figure 5:
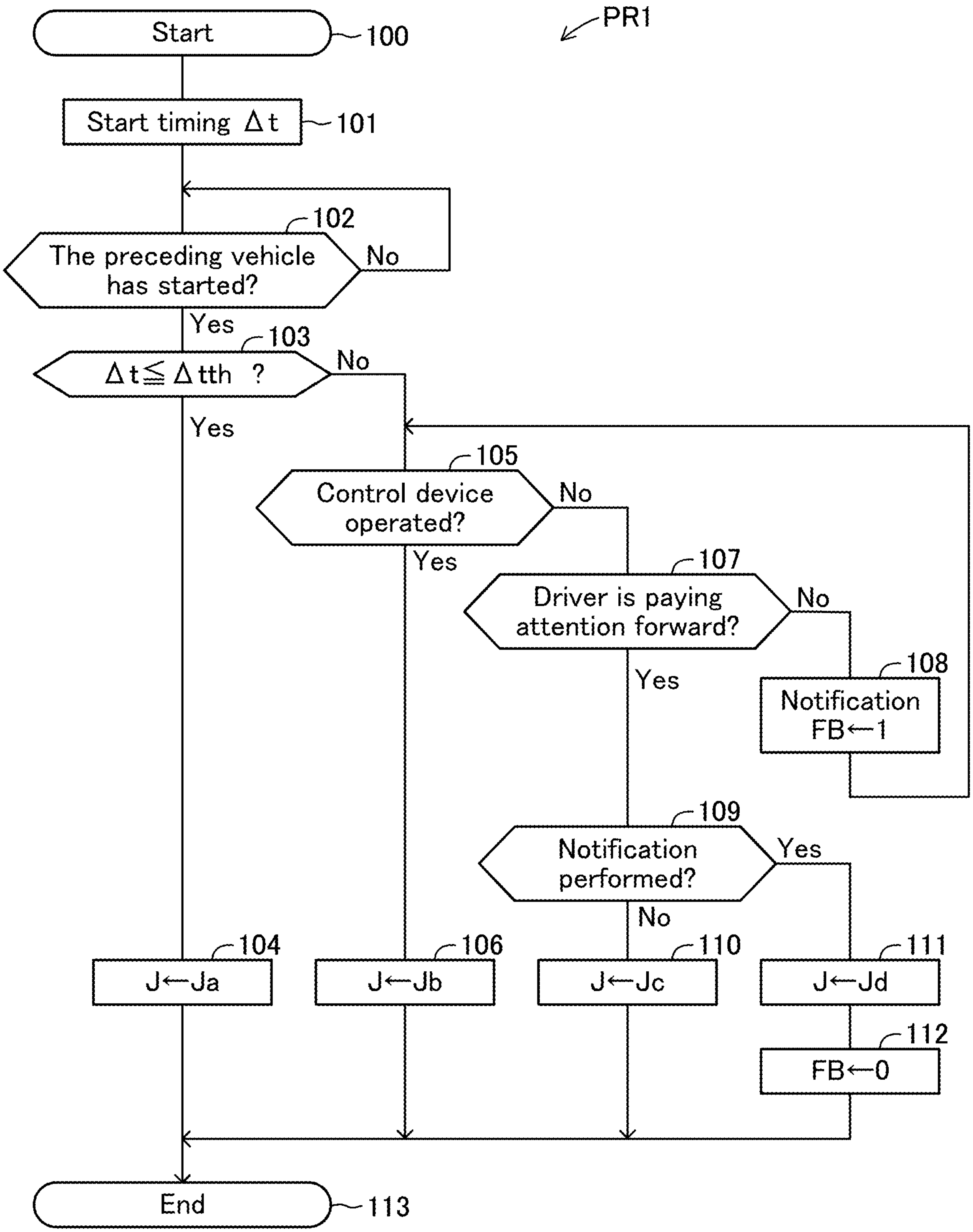
FIG. 5 is a flowchart of a program that realizes the following start function.

Next, referring to FIG. 5, a program PR1 executed by the CPU 10*a* (referred to as 'CPU') of the driving support ECU 10 to realize the following start function is described. When the preceding vehicle PV stops during vehicle-to-vehicle distance control, the CPU stops the own vehicle behind it at moment t0 and then begins executing program PR1. The CPU starts executing program PR1 from step 100 and proceeds to step 101.

At step 101, the CPU starts the timer 10*d* to measure the time Δt and then moves to step 102. There, the CPU determines whether the preceding vehicle PV has started based on information from the forward sensors (at least one of the millimeter-wave radar 21, sonar 22, and forward camera 23). If the CPU determines that the preceding vehicle PV has started (102: Yes), it proceeds to step 103. If not (102: No), it returns to step 102.

At step 103, the CPU determines whether the measured time Δt is less than or equal to the threshold Δtth. If yes (103: Yes), the CPU proceeds to step 104, where it controls the drive device and other systems to start the own vehicle following the preceding vehicle PV, ensuring that the jerk J matches the predetermined value Ja. Then, the CPU moves to step 113 and ends the execution of program PR1.

If the measured time Δt exceeds the threshold Δtth (103: No), the CPU proceeds to step 105 to determine whether the vehicle operation devices (resume switch 27 or accelerator pedal AP) have been operated. If the CPU determines that an operation device has been activated (105: Yes), it moves to step 106 and controls the drive device and other systems to start the own vehicle following the preceding vehicle PV. At this point, the CPU controls the jerk J to match a predetermined value Jb. Then, the CPU proceeds to step 113 and concludes the execution of program PR1.

If, at step 105, the CPU determines that no operation device has been activated (105: No), it moves to step 107 and determines whether the driver is paying attention to the front based on information from the in-vehicle camera 24. If the CPU determines that the driver is paying attention to the front (FA=1) (107: Yes), it proceeds to step 109. However, if the CPU determines that the driver is not paying attention to the front (FA=0) (107: No), it proceeds to step 108 and activates the buzzer 50 for a set duration (FB←1). Then, the CPU returns to step 105. Here, the buzzer flag FB indicates whether the buzzer 50 has been used to alert the driver. If the alert has not been issued, the buzzer flag FB is '0', and if the alert has been issued, it is '1'. The CPU may continuously or intermittently activate the buzzer 50 until the own vehicle starts.

At step 109, the CPU determines whether the buzzer 50 has already been used for alerting. If not (FB=0, 109: No), the CPU proceeds to step 110 and controls the drive device and other systems so that the own vehicle starts following the preceding vehicle PV. At this stage, the CPU controls the jerk J to match the predetermined value Jc. Then, the CPU proceeds to step 113 and concludes the execution of program PR1.

If the buzzer alert has been issued (FB=1, 109: Yes), the CPU moves from step 109 to step 111 and controls the drive device and other systems so that the own vehicle starts following the preceding vehicle PV. At this stage, the CPU controls the jerk J to match a predetermined value Jd, which is smaller than Jc. Then, the CPU proceeds to step 112.

At step 112, the CPU resets the buzzer flag FB (FB←0) and proceeds to step 113 to conclude the execution of program PR1.

If the CPU was activating the buzzer 50 when moving from step 105 to step 106, it ends the activation of the buzzer 50.

(Effect)

In the first situation where the driver is paying attention to the front at the moment t1 when the driving support ECU 10 determines that the preceding vehicle PV has started, the driver's expectation that the own vehicle will start following the preceding vehicle PV is high. Conversely, in the second situation where the driver is not paying attention to the front at the moment t1 and only starts paying attention afterward, the driver's expectation that the own vehicle will start following the preceding vehicle PV is not as high. The driving support ECU 10 controls the drive device and other systems so that the jerk J matches the predetermined value Jc in the first situation and a predetermined value Jd, which is smaller than Jc, in the second situation. Therefore, the manner of acceleration of the own vehicle in the second situation is more gradual compared to the first situation. In other words, the driving support ECU 10 starts the own vehicle in the first manner in the first situation and in a second manner, where the acceleration of the own vehicle is suppressed compared to the first manner, in the second situation. Thus, the driving support device 1 allows the own vehicle to start in a manner that aligns with the driver's expectations when the preceding vehicle PV starts.

Note that this invention is not limited to the embodiment described above and can be modified in various ways within the scope of the invention.

Modification Example 1

In the aforementioned embodiment, the driving support ECU 10 controls the drive device and other systems so that the jerk J matches a predetermined value Jc in the first situation and a value Jd, smaller than Jc, in the second situation. This means that the rate of change of the acceleration a is constant in both the first and second situations. However, the rate of change of the acceleration a does not necessarily have to be constant in these situations. For example, the driving support ECU 10 may store predetermined acceleration increasing characteristics corresponding to each of the first and second situations and control the drive device and other systems so that the acceleration a changes according to the corresponding acceleration increasing characteristic in each situation. In this case, the acceleration increasing characteristic in the second situation would be set more gradual than in the first situation. Additionally, the driving support ECU 10 may store predetermined speed increasing characteristics indicating the change in the target speed vs for both the first and second situations. The ECU 10 can then control the drive device and other systems so that the speed vs of the own vehicle changes according to the speed characteristic set for each situation. Furthermore, the start timing of the own vehicle in the second situation may be delayed compared to that in the first situation. With these configurations, the acceleration of the own vehicle in the second situation is more suppressed compared to the first situation.

Modification Example 2

In the described embodiment, the driving support ECU 10 activates the buzzer 50 when the driver is not paying attention to the front at moment t1. However, the driver may still notice the start of the preceding vehicle and pay attention to the front without the activation of the buzzer 50. Therefore, if the driver is not paying attention to the front at moment t1, the driving support ECU 10 may choose not to activate the buzzer 50 and wait instead. In this case, if the ECU 10 determines that the driver starts paying attention to the front after moment t1, the own vehicle can be started in a manner where acceleration is suppressed, similar to the described embodiment.

What is claimed is:

1. A driving assistance device comprising:

a front sensor for acquiring information about the behavior of a preceding vehicle;

a driver sensor for acquiring information about the direction the driver of the own vehicle is paying attention to;

a processor for controlling the own vehicle to start in a predetermined manner when a certain first condition is met, indicating that the preceding vehicle has started moving while the own vehicle is stopped immediately behind the stopped preceding vehicle; wherein the processor controls the own vehicle to start in a predetermined first manner in the first situation, where a second condition, indicating that the driver was paying attention to the front of the own vehicle, is met at the first point in time when the first condition is met, and controls the own vehicle to start in a second manner, with less acceleration than the first manner, in the second situation where the second condition is not met at the first point in time but is met at a later second point in time after the first point in time and before a predetermined time threshold elapses from the first point in time.

2. The driving assistance device according to claim 1, further comprising a notification device to present certain information to the driver, wherein the processor, if the second condition is not met at the first point in time, causes the notification device to present information urging the driver to pay attention to the front.

3. The driving assistance device according to claim 2, wherein the processor controls the own vehicle to start with a jerk matching a first predetermined value in the first situation, and controls the own vehicle to start with a jerk smaller than the first predetermined value, matching a second predetermined value, in the second situation.

4. The driving assistance device according to claim 1, wherein the processor controls the own vehicle to start with a jerk matching a first predetermined value in the first situation, and controls the own vehicle to start with a jerk smaller than the first predetermined value, matching a second predetermined value, in the second situation.

5. A method for driving assistance comprising the steps of:

a first information acquisition step where information about the behavior of a preceding vehicle is acquired from a front sensor;

a second information acquisition step where information about the direction the driver of the own vehicle is paying attention to is acquired from a driver sensor;

a follow-start step where the own vehicle is controlled to start in a predetermined manner when a certain first condition is met, indicating that the preceding vehicle has started moving while the own vehicle is stopped immediately behind the stopped preceding vehicle; wherein in the follow-start step, the own vehicle is controlled to start in a predetermined first manner in the first situation, where a second condition, indicating that the driver was paying attention to the front of the own vehicle, is met at the first point in time when the first condition is met, and the own vehicle is controlled to start in a second manner, with less acceleration than the first manner, in the second situation where the second condition is not met at the first point in time but is met at a later second point in time after the first point in time and before a predetermined time threshold elapses from the first point in time.

6. A non-transitory storage medium storing a driving assistance program for causing a computer equipped in the own vehicle to execute:

a first information acquisition step where information about the behavior of a preceding vehicle is acquired from a front sensor;

a second information acquisition step where information about the direction the driver of the own vehicle is paying attention to is acquired from a driver sensor;

a follow-start step where the own vehicle is controlled to start in a predetermined manner when a certain first condition is met, indicating that the preceding vehicle has started moving while the own vehicle is stopped immediately behind the stopped preceding vehicle; wherein in the follow-start step, the own vehicle is controlled to start in a predetermined first manner in the first situation, where a second condition, indicating that the driver was paying attention to the front of the own vehicle, is met at the first point in time when the first condition is met, and the own vehicle is controlled to start in a second manner, with less acceleration than the first manner, in the second situation where the second condition is not met at the first point in time but is met at a later second point in time after the first point in time and before a predetermined time threshold elapses from the first point in time.

* * * * *